No. 671,701. Patented Apr. 9, 1901.
W. JENNINGS.
TIRE FASTENER.
(Application filed Dec. 7, 1900.)
(No Model.)

Witnesses:
J. F. Groat.
H. J. Benchard

William Jennings. Inventor
By Marion & Marion
Attorneys

THE NORRIS PETERS CO., PHOTO-LITHO., WASHINGTON, D. C.

UNITED STATES PATENT OFFICE.

WILLIAM JENNINGS, OF MONTREAL, CANADA.

TIRE-FASTENER.

SPECIFICATION forming part of Letters Patent No. 671,701, dated April 9, 1901.

Application filed December 7, 1900. Serial No. 38,988. (No model.)

*To all whom it may concern:*

Be it known that I, WILLIAM JENNINGS, a subject of Her Majesty the Queen of Great Britain, residing in the city and district of Montreal, Province of Quebec, Canada, have invented certain new and useful Improvements in Tire-Fasteners; and I do hereby declare that the following is a full, clear, and exact description of the invention, such as will enable others skilled in the art to which it appertains to make and use the same.

Rubber tires employed on the wheels of carriages and wagons are subject to decay owing to the action of water penetrating to the interior or the fastener-wire passages of the rubber substance, and the presence of water in the tire is furthermore objectionable because it tends to rust the metallic fastener-wire. Owing to compression and expansion of the rubber tire when the vehicle is in use, and particularly under a heavy load, an air-suction is set up in the passages of the tire, which suction tends to draw in water at the tire-joint, and thus create the objections above noted.

The object of this invention is to effectually exclude the admission of moisture and water at the abutting or jointed portions of a rubber tire; and to this end the invention consists in the combination and construction of parts, which will be hereinafter described and claimed.

Figure 1:
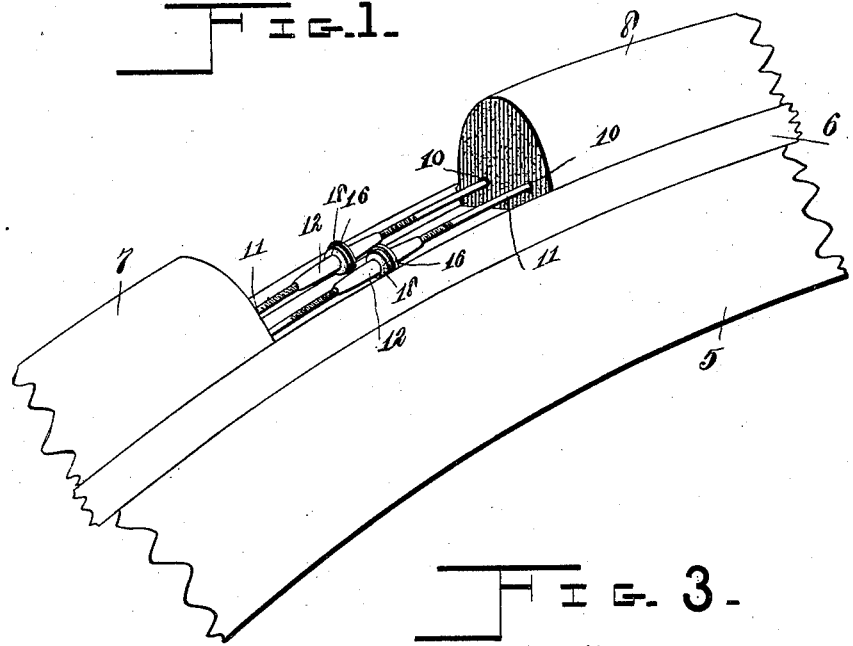
Figure 3:
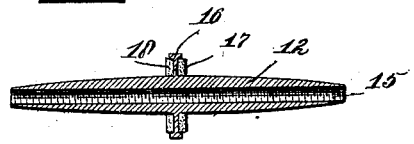
Figure 2:
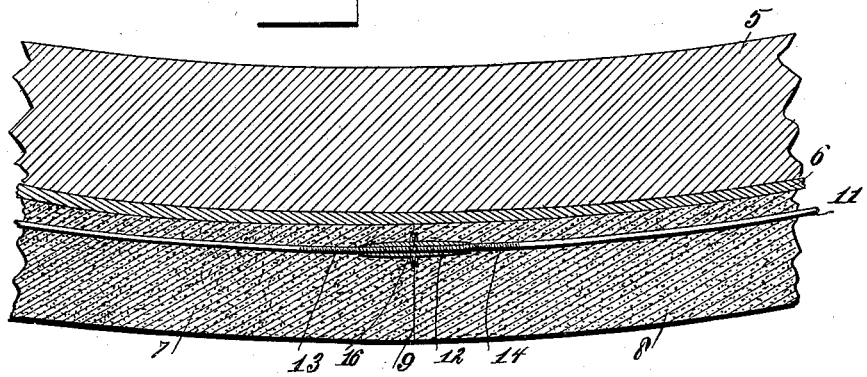

In the drawings hereto annexed, forming a part of this specification, Figure 1 is a perspective view of a portion of a wheel-rim and a rubber tire, illustrating the improved tire-fastener, the adjacent end portions of the rubber tire being separated. Fig. 2 is a longitudinal section through a portion of a wheel-rim and a tire, illustrating the improved fastener and showing the tire closed thereover. Fig. 3 is an enlarged longitudinal section through a sleeve and illustrating the collar and the gaskets seated against the collar.

The same numerals of reference denote like parts in each figure of the drawings.

5 designates a portion of a wheel-felly, 6 the channeled rim, and 7 8 the portions of a rubber tire which are adapted to abut against one another on the radial line, (indicated by Fig. 2,) and thereby form the joint 9. It is customary in some rubber tires to provide the same with longitudinal openings 10, through which extend the fastener-wires 11. These wires extend entirely through the tire around the channeled rim and have their ends united by the coupling-sleeves 12. It is customary to employ two fastening-wires 11 and the sleeves 12 therefor; but I do not desire to restrict myself to any particular number of wires and sleeves.

Each fastener-wire has its end portions threaded, as at 13 14, with which threaded portions the sleeve 12 is adapted to have engagement, because said sleeve is formed with a longitudinal bore or passage 15, having a single continuous screw-thread, as clearly shown by Fig. 3. As disclosed in a prior application filed by me on October 12, 1900, Serial No. 32,815, I make the threads 13 similar to the threads 14 on the adjacent end portions of each fastener-wire, and this method of threading the end portions of the wire enables the sleeve 12 to be unscrewed partly from one end portion of the wire onto or upon the other end portion of the wire and into engagement with the threads thereon.

The coupling-sleeve spans the joint 9 at the abutting portions of the tire, and said sleeve has its opposite portions embedded in the wire-openings 10 at said abutting portions of the wire.

The essence of this invention resides in a moisture-excluding connection between the sleeve and the abutting ends of a divided tire, and this is obtained by the provision of an annular collar 16 and the gaskets 17 18, said collar and the gaskets being interposed between the abutting ends of the tire, so as to have intimate contact therewith. It is my practice to make this annular collar 16 fast or integral with the coupling-sleeve 12 at the middle portion thereof, and, if desired, this collar may be provided with recesses in its opposite faces, as shown by Fig. 3, for the reception of the gaskets, which, however, should be of such thickness as to protrude beyond the faces of the collar.

It is well known to those skilled in the art that rubber tires are placed on a vehicle-wheel under compression in order that the joint in the tire may be kept closed, and this compression is utilized to assist in securing the necessary tight connection between the sleeve, its collar, and the end portions of the tire when the joint is closed, as represented by Fig. 2.

The coupling-sleeve 12 is made quite long for the purpose of having the extended threaded engagement with the adjacent end portions of the fastener-wire, thus securing very great strength in the tire-fastening means, and particularly at the joint, which is secured by the coupled ends of said wire, and, furthermore, I prefer to taper the sleeve from its middle toward the opposite end portions, whereby said tapered ends may be embedded in the wire-opening of the tire, so as to tightly plug or close said opening, and thereby assist in excluding moisture and water from the interior of the rubber tire.

In applying the fastening the rubber tire is adjusted around a wheel. One end of each wire is held by a suitable clamp and the other end of each wire is drawn through the tire, the end portions of the latter being spaced, as shown by Fig. 1, and held against movement by clamps or other suitable means, so that the tire will be placed under compression by the operation of drawing the wire through said tire in order to contract the diameter of the wires sufficiently to secure the tire firmly in the channeled rim of the wheel. The wires now have the two ends thereof engaged by suitable clamps for the purpose of preventing release in the compression of the tire, and the threads of like hand having been formed on the end portions of each wire the sleeves are adjusted to have engagement with said threaded ends of the wire. The sleeves couple the wires tightly in order to hold the tire firmly on the wheel, and this having been accomplished the clamps are released from the wires, and the end portions of the tire are drawn up by suitable pulling devices in a manner to make the abutting ends meet over the middle portion of the coupling-sleeves, thus producing the joint, as shown by Fig. 2. This operation makes the end portions of each sleeve enter the wire-openings in the tire, so as to plug up the latter and also utilize the compression of the tire as the force for compressing the gaskets 17 18 between the abutting faces of the tire at the joint thereof, whereby the sleeve serves to strongly unite the fastening-wire, and a moisture-excluding connection is secured between said sleeve and the tire at the joint of the latter.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Having thus described my invention, what I claim as new is—

1. The combination with a divided cushion-tire, and a fastener wire or rod, of a coupling-sleeve provided with a moisture-excluding collar and having its end portions plugging the openings in said tire at the division thereof.

2. The combination with a divided cushion-tire, and a fastener wire or rod, of a coupling-sleeve engaging with said wire or rod, said sleeve having means substantially as described interposed between the ends of the tire and forming a moisture-excluding joint therewith.

3. The combination with a divided cushion-tire, and a fastener wire or rod, of a coupling-sleeve provided with a collar, and gaskets interposed between the end portions of the tire and said collar, substantially as described.

4. The combination with a divided cushion-tire, of a sleeve embedded in the abutting portions of the tire and spanning the joint thereof, said sleeve being surrounded by a collar and by packings which are interposed between said abutting portions of the tire, substantially as described.

In witness whereof I have hereunto set my hand in the presence of two witnesses.

WILLIAM JENNINGS.

Witnesses:
H. T. BERNHARD,
JOHN F. DEUFFERWIEL.